United States Patent [19]

Chi

[11] Patent Number: 5,405,202
[45] Date of Patent: Apr. 11, 1995

[54] HEADSET FOR A BICYCLE

[76] Inventor: Yi Chen Chi, 139-5, An Mei Rd., Mei Shan Village, Hou Li Hsiang, Taichung Hsien, Taiwan, Prov. of China

[21] Appl. No.: 263,087

[22] Filed: Jun. 21, 1994

[51] Int. Cl.⁶ .................................................. B62K 21/06
[52] U.S. Cl. .................................. 384/545; 280/279; 384/571
[58] Field of Search ............... 384/571, 545, 618, 619; 280/279, 280; 74/551.1, 551.2, 551.3

[56] References Cited

U.S. PATENT DOCUMENTS

| | | | |
|---|---|---|---|
| 392,889 | 11/1888 | Sponsel | 280/279 |
| 4,189,167 | 2/1980 | Dubois | 280/279 |
| 4,303,257 | 12/1981 | Perotti et al. | 280/279 |
| 5,163,758 | 11/1992 | Chi | 384/545 X |

FOREIGN PATENT DOCUMENTS 170163  7/1993  Japan ..................... 280/279

*Primary Examiner*—Thomas R. Hannon
*Attorney, Agent, or Firm*—McCubbrey, Bartels & Ward

[57] ABSTRACT

A headset for a bicycle includes an upper bearing assembly and a lower bearing assembly between which is disposed a head tube and a steerer tube is inserted through head tube and rotatably engaged between the two assemblies. The upper bearing assembly has a bearing with a plurality of rollers each roller is disposed in an inclined fashion by 10–20 degrees regarding to a vertical line of said assembly.

2 Claims, 3 Drawing Sheets

HEADSET FOR A BICYCLE

BACKGROUND OF THE INVENTION

The present invention relates to a headset for a bicycle, and more particularly to a headset which has an upper bearing assembly and a lower bearing assembly each bearing having a plurality of rollers disposed in an inclined fashion therein and the inclined angle regarding to a vertical line of the rollers is 10-20 degrees for the upper bearing assembly and 45 degrees for the lower bearing assembly respectively.

Referring to FIG. 1, a conventional headset of a bicycle generally includes an upper bearing assembly 50 and a lower bearing assembly 60 between which a head tube 70 is disposed. A steerer tube 80 is inserted from the lower bearing assembly 60 via the head tube 70 to the upper bearing assembly 50 and is threaded engaged to an adjusting nut 51 disposed on a top of the upper bearing assembly 50 such that the steerer tube 80 is rotatably engaged between the upper and lower bearing assemblies 50, 60. Each bearing assembly has a first race 501 or 601 and a second race 502 or 602 which respectively abut a first bowl 52 or 61 and a second bowl 53 or 62. A bearing 503 or 603 is securely engaged between the first and second races 501, 502 or 601, 602, generally, the bearings 503, 603 are disposed by the same inclined angle of 45 degrees regarding to a vertical line of respective assembly 50, 60. The upper and lower bearing assemblies 50, 60 require different installing standards, namely, the upper bearing assembly 50 requires less rotating feature than the lower bearing assembly 60 because the lower bearing assembly 60 is designed for providing a smoothly rotating feature for the steerer tube 80, however, the upper bearing assembly 50 is required to hold and maintain the head tube and the two assemblies 50, 60 in place rather than to provide a smoothly rotating feature. Therefore, because of the similarity in design of the two bearings 503, 603, when an assembler rotates the adjusting nut 51, a vertical component force will transfer to the lower bearing 603 and the larger the vertical component force is produced the less rotating feature of the lower bearing 603 performs, and the larger the angle of the bearing disposed regarding to the vertical line the larger the vertical component force will be produced, this is opposite to the principle of the features required of the bearings 503, 603 mentioned above. Should the lower bearing 603 rotate unsatisfactorily, the assembler must loosen both the upper and lower bearing assemblies 50, 60 and re-check them again.

The present invention intends to provide a headset where the upper bearing has a plurality of rollers disposed therein in an inclined fashion, the inclined angle is 10-20 degrees regarding to a vertical line and by which a less vertical component force will be produced when assembling the upper bearing assembly therefore mitigating and/or obviating the above-mentioned problems.

SUMMARY OF THE INVENTION

The present invention provides a headset for a bicycle includes an upper bearing assembly and a lower bearing assembly between which a head tube is disposed and a steerer tube is inserted through head tube and is rotatably engaged between the two assemblies. The upper bearing assembly has a bearing with a plurality of rollers each roller is disposed in an inclined fashion by 10-20 degrees regarding to a vertical line of said assembly.

It is an object of the present invention to provide a headset having an upper bearing with a plurality of inclined rollers by 10-20 degrees regarding to a vertical line.

It is another object of the present invention to provide a headset whose upper bearing assembly transfers less vertical force to its lower bearing assembly when the upper bearing assembly is adjusted.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
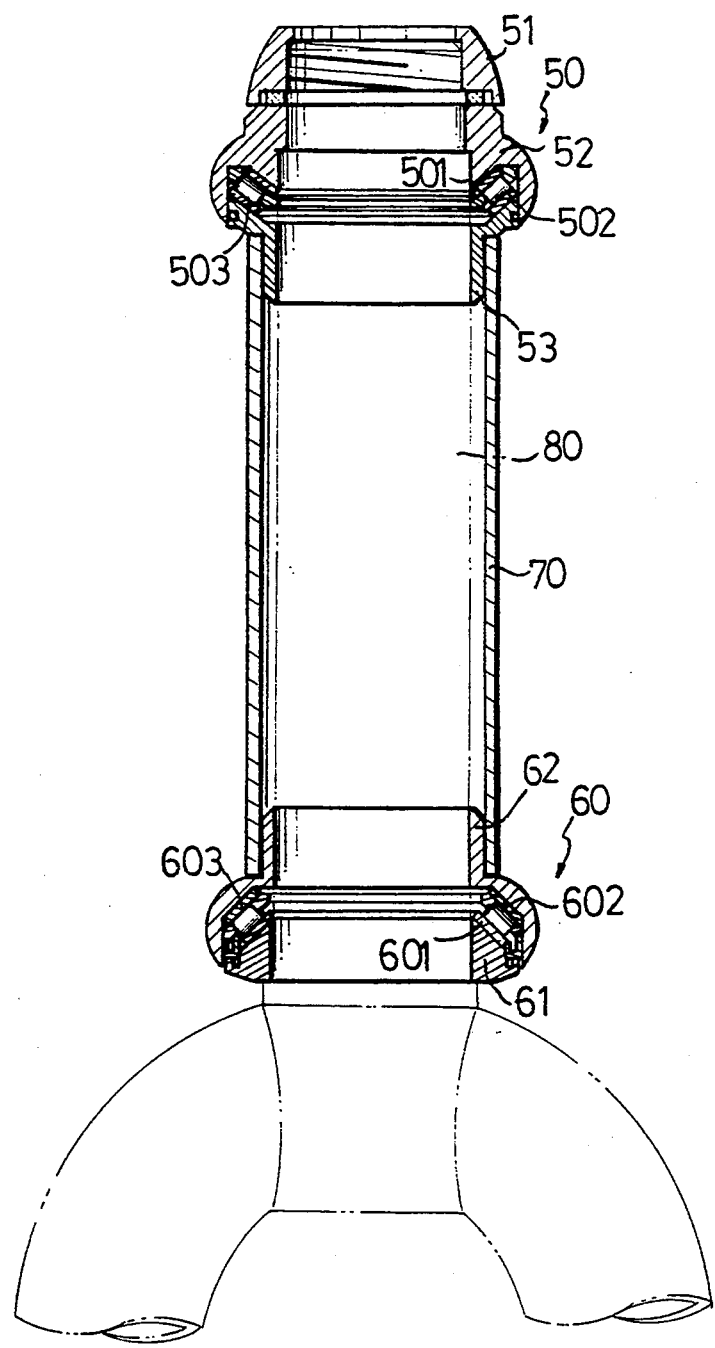
FIG. 1 is a side elevational view, partly in section, of a conventional headset.
Figure 2:
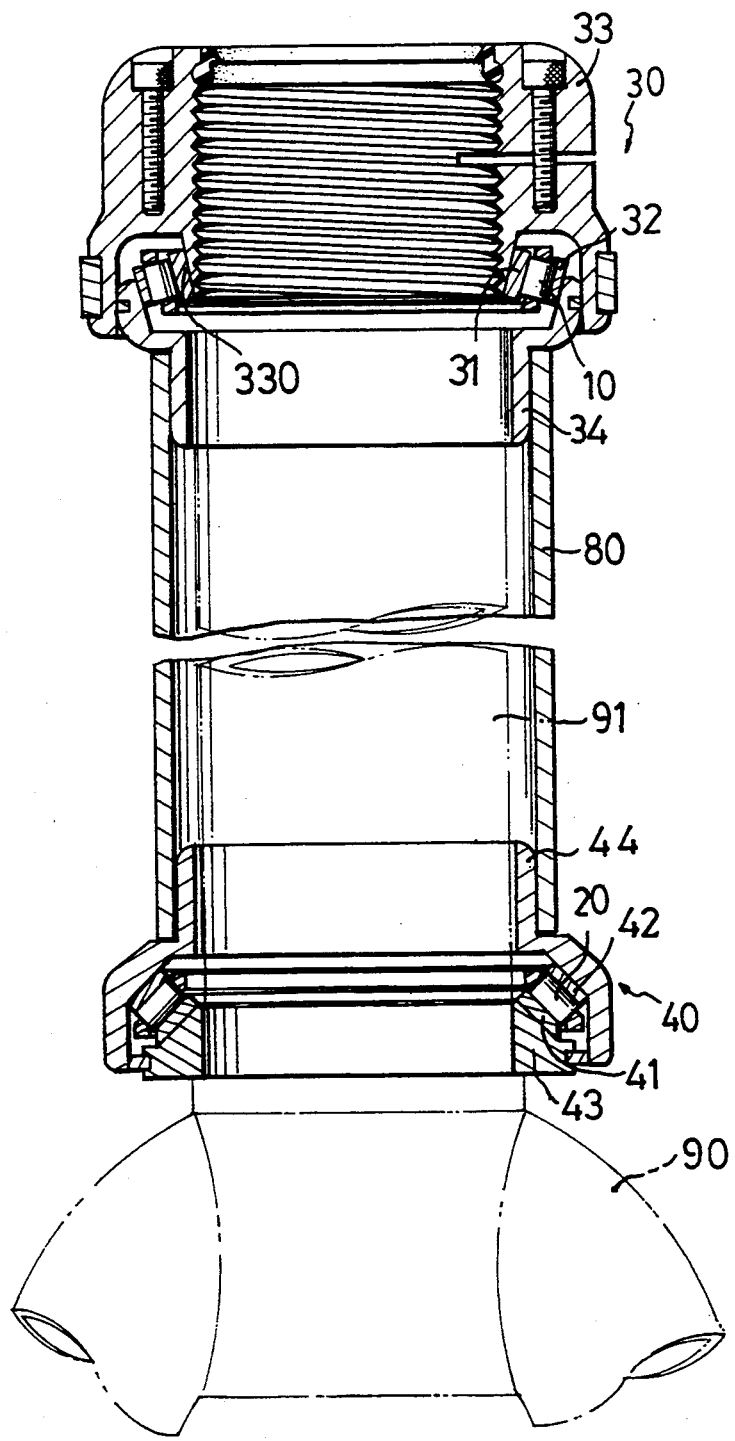
FIG. 2 is a side elevational view, partly in section, of a headset in accordance with the present invention.

Referring to the drawings and initially to FIG. 2, a headset in accordance with the present invention generally includes an upper bearing assembly 30 and a lower bearing assembly 40 between which a head tube 80 is disposed. A front fork 90 is inserted from the lower bearing assembly 40, by a steerer tube 91 thereof, via the head tube 80 to the upper bearing assembly 30 and is threadedly engaged to an adjusting nut 33 disposed on a top of the upper bearing assembly 30 such that the steerer tube is rotatably engaged between the upper and lower bearing assemblies 30, 40. The upper bearing assembly 30 includes first and second races 31, 32, a bowl 34 and a bearing disposed between the first and second races 31, 32, the lower bearing assembly 40 includes first and second races 41, 42, first and second bowls 43, 44 and a bearing disposed between the first and second races 41, 42. The upper bearing of the upper bearing assembly 30 includes a plurality of rollers 10 which are disposed therein in an inclined fashion by an angle 10-20 degrees regarding to a vertical line of the assembly 30. The lower bearing of the lower bearing assembly 40 also includes a plurality of rollers 20 which are disposed therein in an inclined fashion by the same angle as the conventional, that is 45 degrees regarding to a vertical line of the lower bearing assembly 40.

Figure 3:
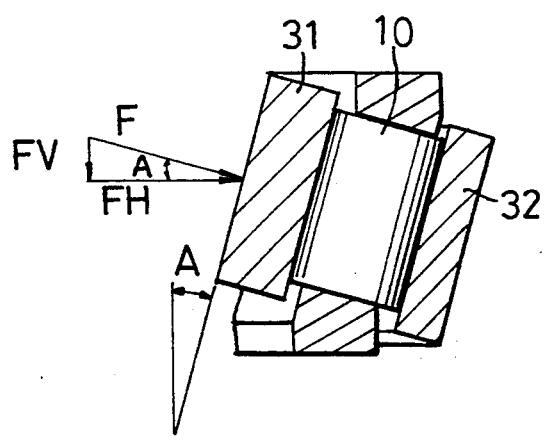
FIG. 3 is a description view showing two directional component forces, FH and FV, produced by exerting a force F on the inclined roller of the bearing in accordance with the present invention.

Further referring now to FIGS. 2 and 3, the adjusting nut 33 has an outer tapered surface 330 formed on a skirt portion thereof, the tapered surface 330 having the same inclined angle as the inclined angle of the rollers 10 of the upper bearing and contacting the rollers 10. When a user or an assembler adjusts the upper bearing assembly 30 by rotating the adjusting nut 33, the tapered surface 330 exerts a force (F) vertical to a periphery of the first race 31 and roller 10 thus pulls the steerer tube 91 up and the head tube 80 and the lower bearing assembly 40 are securely engaged between the front fork 90 and the upper bearing assembly 30. The force (F) is composed by a vertical component force FV which will be transferred to the lower bearing, and a horizontal component force FH, the quantity of the force FV is derived by the arithmetic relationship FsinA wherein A is the inclined angle regarding to the vertical line. Since the angle A is 10-20 degrees and is less than 45 degrees, in the inclined angle of the conventional upper bearing, therefore, the FV is less than that of the conventional. This means that the upper bearing can be securely disposed by rotating the adjusting nut 33 while the lower bearing still maintains its excellent rotating feature.

Accordingly, the headset in accordance with the present invention provides an improvement assembling feature in which the adjusting of the upper bearing effects less the rotating feature of the lower bearing.

Although the invention has been explained in relation to its preferred embodiment, it is to be understood that many other possible modifications and variations can be made without departing from the spirit and scope of the invention as hereinafter claimed.

I claim:

1. A headset for a bicycle, comprising an upper bearing assembly and a lower bearing assembly, a head tube being disposed between said two assemblies and a steerer tube being inserted through said head tube and rotatably engaged between said two assemblies, said upper bearing assembly having a bearing with a plurality of rollers each said roller being disposed in an inclined fashion by 10-20 degrees regarding to a vertical line of said assembly and said lower bearing assembly having a bearing with a plurality of rollers each roller disposed in an inclined fashion by 45 degrees regarding to a vertical line of said assembly.

2. The headset as claimed in claim 1 wherein said upper assembly has a first race and a second race and between which said bearing is disposed, said upper bearing assembly having an adjusting nut disposed on a top thereof, said adjusting nut having a tapered surface formed contacting and facing to said bearing with same inclined angle regarding to said vertical line.

* * * * *